E. R. TRAMMELL.
AUTOMATIC DIRIGIBLE LIGHT FOR AUTOMOBILES.
APPLICATION FILED APR. 10, 1914.

1,127,321.

Patented Feb. 2, 1915.
2 SHEETS—SHEET 1.

Inventor
Erasmus R. Trammell

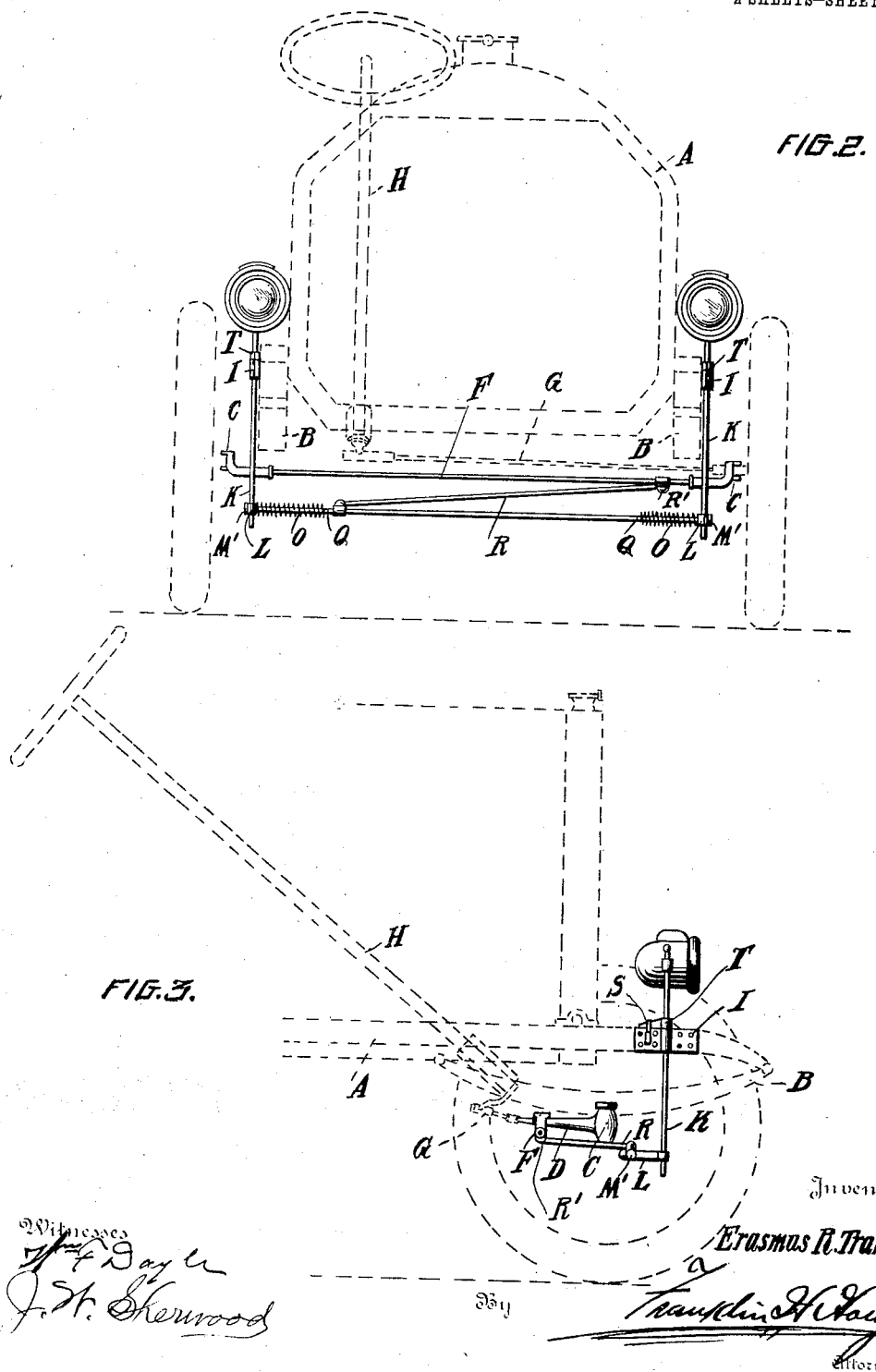

UNITED STATES PATENT OFFICE.

ERASMUS R. TRAMMELL, OF LAKELAND, FLORIDA.

AUTOMATIC DIRIGIBLE LIGHT FOR AUTOMOBILES.

1,127,321.

Specification of Letters Patent.    Patented Feb. 2, 1915.

Application filed April 10, 1914.   Serial No. 831,086.

*To all whom it may concern:*

Be it known that I, ERASMUS R. TRAMMELL, a citizen of the United States, residing at Lakeland, in the county of Polk and State of Florida, have invented certain new and useful Improvements in Automatic Dirigible Lights for Automobiles, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic dirigible lights for automobiles and other vehicles and comprises a simple and efficient device of this nature so arranged that either one or the other of the lights is adapted to throw its rays automatically parallel with one of the wheels as it turns, while the other throws the rays directly ahead of the vehicle and at an angle to the wheel when turned.

The invention comprises various means whereby both of the lights are adapted to turn automatically to throw rays to light the paths of both of the forward wheels of the vehicle.

The invention consists further of various details of construction, combinations and arrangements of parts which will be hereinafter fully described, shown in the accompanying drawings and then specifically defined in the appended claims.

Figure 1:
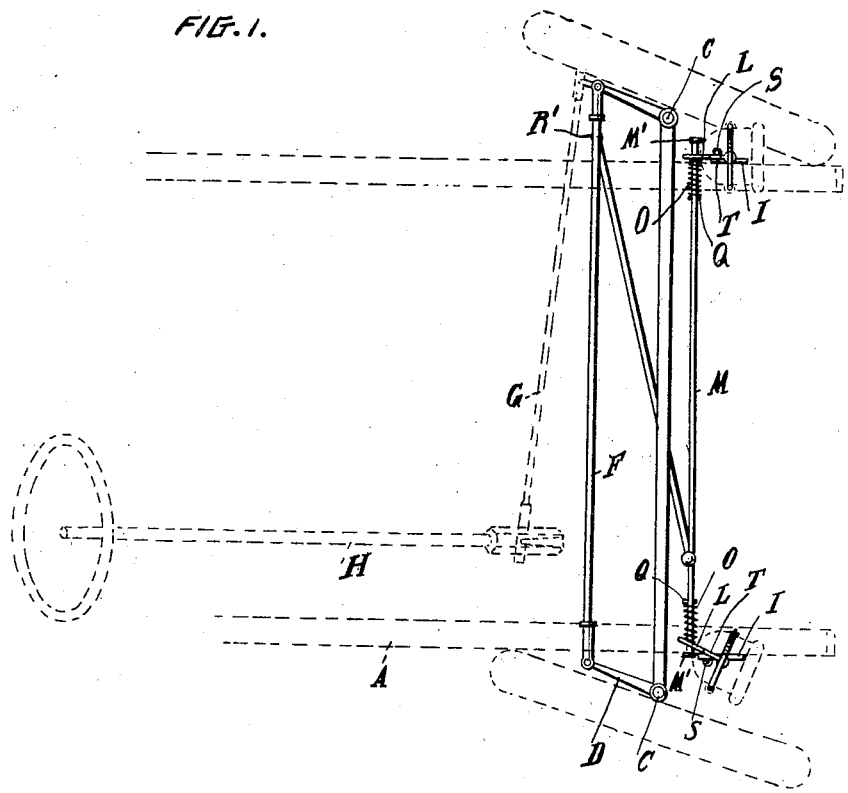
Figure 4:
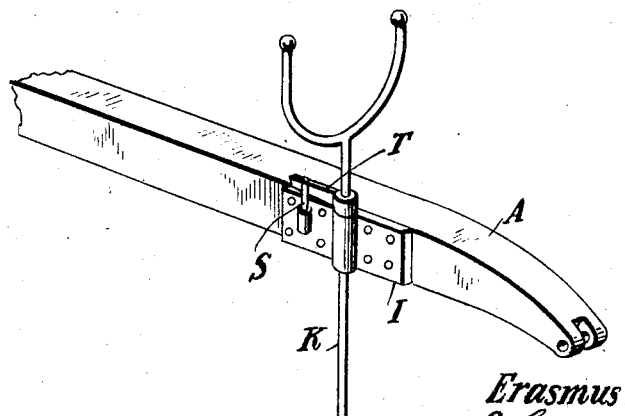

My invention is illustrated in the accompanying drawings, in which:

Figure 1 is a top plan view of my automatic dirigible light apparatus showing in dotted lines the forward portion of the vehicle to which the apparatus is attached. Fig. 2 is an end elevation. Fig. 3 is a side elevation of the forward part of an automobile showing the dirigible light apparatus applied thereto, and Fig. 4 is an enlarged detail view of the means for limiting the turning movement of one or the other of the lights.

Reference now being had to the details of the drawings by letter, A designates the frame of an automobile and B the usual spring which is positioned underneath the forward part of the frame and is connected thereto in any suitable manner.

C designates the stub axle of the vehicle having a crank arm D projecting therefrom to which the steering rod F is pivotally connected. Each of the forward wheels is provided with a similar crank arm which are connected by said rod F in the usual manner.

G designates a connecting rod fastened to one of the cranks D and its other end having gear connection with the steering post H in the usual manner. Mounted upon the opposite sides of the frame are the bearing members I in which the lamp supporting shafts K are journaled, and L designates a crank arm which is fastened to the lower part of the shank portion of the lamp supporting shaft and each crank arm L is apertured for the reception of the lamp connecting rod M, which latter has a head M' at each end and which rod, it will be noted upon reference to Fig. 1 of the drawings, passes through a similar crank arm upon the opposite side of the machine.

Coiled springs, designated by letter O, are mounted upon the lamp connecting rod and each is interposed between a pin Q and a crank arm N. A diagonally disposed lamp controlling rod R is pivotally connected at R' to the cross rod F and its forward end pivotally connected to the lamp connecting rod M.

Upon reference to Figs. 2 and 3 of the drawings, it will be noted that an arm T is fastened to the lamp supporting shaft and a pin S is detachably held in a socket member fastened to the frame, said pin being adapted to be positioned in the path of the arm T to limit the rocking movement of the lamp supporting shaft in one direction. Said pins, one being provided upon each side of the frame, are provided for the purpose of preventing one lamp from throwing its rays parallel to the turning wheel, while the other lamp will be thrown so that its rays will light the path to be traversed by the turning wheel at one side or the other.

The operation of my invention will be readily understood and is as follows: When it is desired to cause the lamp at the right side of the machine, as shown in Fig. 1, to be turned automatically with the wheel to the right, the pin upon the left side is inserted in the socket and against which an arm T will contact to prevent the left lamp from turning while the head M' at the opposite end of the rod M will contact with the arm L and cause the lamp to turn to the position shown in dotted lines. As the steering apparatus throws the wheels to the position shown in dotted lines in Fig. 1, the spring O at the left end of the rod will be under tension, thus serving to return the lamp at the right to its normal position when the wheels are thrown back to their normal positions.

By the provision of the apparatus shown and described, it will be noted that either one or the other of the lamps may be held to throw its rays straight ahead of the machine, while the other lamp is allowed to turn with the wheel to light the path upon the turning side. If preferred, the pins may be removed from the sockets and which will allow both of the lamps to turn together with the wheels.

What I claim to be new is:

1. An automatic dirigible light apparatus for automobiles, etc., comprising, in combination with the frame of the machine, stub axles with laterally extending crank arms, a rod connecting said arms, bearing members mounted upon the frame, lamp supporting standards journaled in said members, an apertured crank arm fastened to each standard, a rod passing through the apertures of said crank arms which are fastened to the standards and having heads at the ends thereof, a lamp controlling rod connecting the rod which connects the stub axles with the lamp connecting rod, springs mounted upon the lamp connecting rod and bearing against said apertured crank arms, and means for allowing one lamp to turn independent of the other.

2. An automatic dirigible light apparatus for automobiles, etc., comprising, in combination with the frame of the machine, stub axles with laterally extending crank arms, a rod connecting said arms, bearing members mounted upon the frame, lamp supporting standards journaled in said members, an apertured crank arm fastened to each standard, a rod passing through the apertures of said crank arms and having heads at the ends thereof, a lamp controlling rod connecting the rod which connects the stub axles with the lamp connecting rod, springs mounted upon the lamp connecting rod and bearing against said apertured crank arms, pins fastened to the lamp connecting rods, springs interposed between said pins and the apertured arms, and means for allowing one lamp to turn independent of the other.

3. An automatic dirigible light apparatus for automobiles, etc., comprising, in combination with the frame of the machine, stub axles with laterally extending crank arms, a rod connecting said arms, bearing members mounted upon the frame, lamp supporting standards journaled in said members, an apertured crank arm fastened to each standard, a rod passing through the apertures of said crank arms and having heads at the ends thereof, a lamp controlling rod connecting the rod which connects the stub axles with the lamp connecting rod, springs mounted upon the lamp connecting rod and bearing against said apertured crank arms, pins fastened to the lamp connecting rods, springs interposed between said pins and the apertured arms, a second crank arm fixed to each lamp standard, a pin designed to be attached to the frame and disposed in the path of one of said second referred to crank arms and serving to hold one lamp or the other from turning with the wheels of the machine.

4. An automatic dirigible light apparatus for automobiles, etc., comprising, in combination with the frame of the machine, stub axles with laterally extending crank arms, a rod connecting said arms, bearing members mounted upon the frame, lamp supporting standards journaled in said members, an apertured crank arm fastened to each standard, a rod passing through the apertures of said crank arms and having heads at the ends thereof, a lamp controlling rod connecting the rod which connects the stub axles with the lamp connecting rod, springs mounted upon the lamp connecting rod and bearing against said apertured crank arms, pins fastened to the lamp connecting rods, springs interposed between said pins and the apertured arms, a second crank arm fixed to each lamp standard, a pin designed to be attached to the frame and disposed in the path of one of said second referred to crank arms and serving to hold one lamp or the other from turning with the wheels of the machine.

In testimony whereof I hereunto affix my signature in presence of two witnesses.

ERASMUS R. TRAMMELL.

Witnesses:
A. L. HOUGH,
FRANKLIN H. HOUGH.